United States Patent
Baenziger et al.

(10) Patent No.: US 6,830,209 B1
(45) Date of Patent: Dec. 14, 2004

(54) LEVEL WIND MECHANISM

(76) Inventors: Robert C. Baenziger, 1001 S. Mudsprings Rd., Payson, AR (US) 85541; Casey J. Childre, 19922 Brinks Willis Rd., Foley, AL (US) 36535

( * ) Notice: Subject to any disclaimer, the term of this patent is extended or adjusted under 35 U.S.C. 154(b) by 0 days.

(21) Appl. No.: 10/684,972

(22) Filed: Oct. 14, 2003

(51) Int. Cl.$^7$ ............................................... A01K 89/01
(52) U.S. Cl. ...................................................... 242/278
(58) Field of Search ................................ 242/277, 278, 242/279, 273, 241, 242, 274

(56) References Cited

U.S. PATENT DOCUMENTS

| | | | |
|---|---|---|---|
| 828,969 A | * | 8/1906 | Rhodes ........................ 242/277 |
| 1,438,007 A | | 12/1922 | Welch |
| 1,456,283 A | | 5/1923 | Schmmid |
| 1,507,404 A | | 9/1924 | Welch |
| 1,619,448 A | | 3/1927 | Vance |
| 1,774,789 A | | 9/1930 | Dina |
| 1,898,316 A | | 2/1933 | Schafer |
| 1,964,965 A | | 7/1934 | Smelser |
| 2,198,231 A | | 4/1940 | Schafer |
| 2,204,125 A | | 6/1940 | Dayton |
| 2,461,884 A | * | 2/1949 | Elsinger et al. ............. 242/278 |
| 2,520,552 A | | 8/1950 | Kilian |
| 2,609,161 A | | 9/1952 | Guhlin et al. |
| 2,613,044 A | | 10/1952 | Zetts |
| 3,111,287 A | | 11/1963 | Baenziger |
| 3,171,609 A | | 3/1965 | Baenziger |
| 3,612,425 A | | 10/1971 | Shakespeare et al. |
| 3,670,985 A | | 6/1972 | Morishita |
| 3,993,264 A | | 11/1976 | Kamikawa |
| 4,285,476 A | | 8/1981 | Baenziger |
| 4,341,366 A | | 7/1982 | Kawada |
| 4,361,293 A | | 11/1982 | Baenziger |
| 4,402,470 A | | 9/1983 | Hamayasu |
| 4,557,429 A | | 12/1985 | Atobe |
| 4,580,741 A | | 4/1986 | Murakami et al. |
| 4,666,101 A | | 5/1987 | Atobe |
| 4,772,410 A | | 9/1988 | Sato |
| 4,807,827 A | | 2/1989 | Welch |
| 5,388,776 A | | 2/1995 | Childre |
| 6,446,895 B1 | | 9/2002 | Baenziger et al. |

* cited by examiner

*Primary Examiner*—Emmanuel Marcelo
(74) *Attorney, Agent, or Firm*—Cook, Alex, McFarron, Manzo, Cummings & Mehler, Ltd.

(57) ABSTRACT

A fishing reel with side walls includes a spool shaft rotatably supported therebetween and a level wind comprising a line guide having an eyelet therewith through which the fishing line is threaded. The spool shaft supports a spool that holds the fishing line. The level wind comprises a multiple-part transverse shaft rotatably secured between the side walls in front of the spool. The transverse shaft is adapted to be rotated by the driving gear, and is formed with a single continuous helical thread along the length thereof extending approximately 180° along the length of the shaft in a first direction and the approximately 180° along the shaft in the opposite direction. The threaded portion of the shaft is engaged by a pawl carried by the line guide.

24 Claims, 4 Drawing Sheets

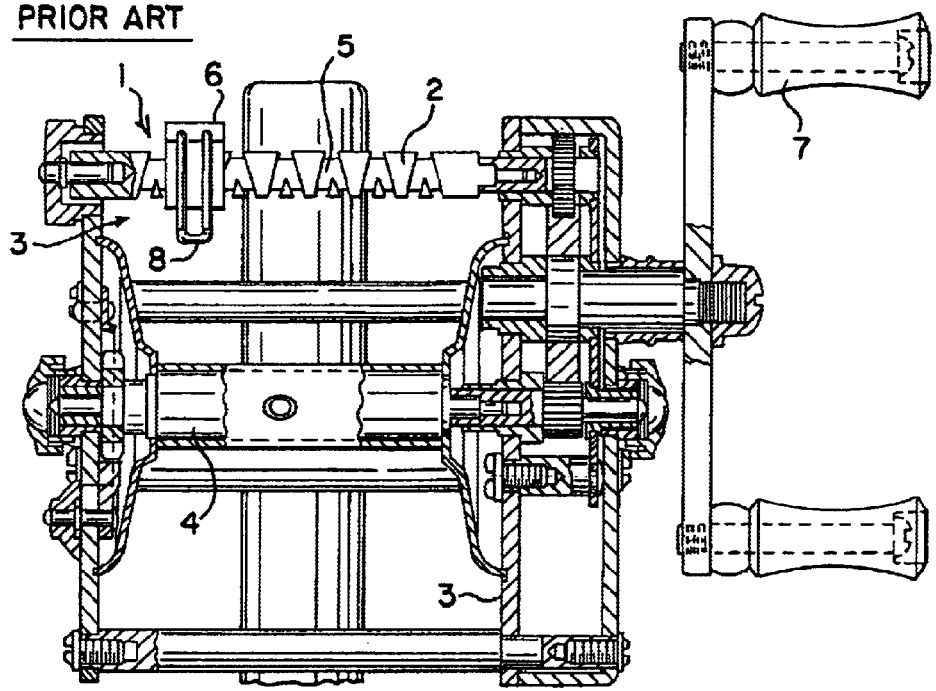
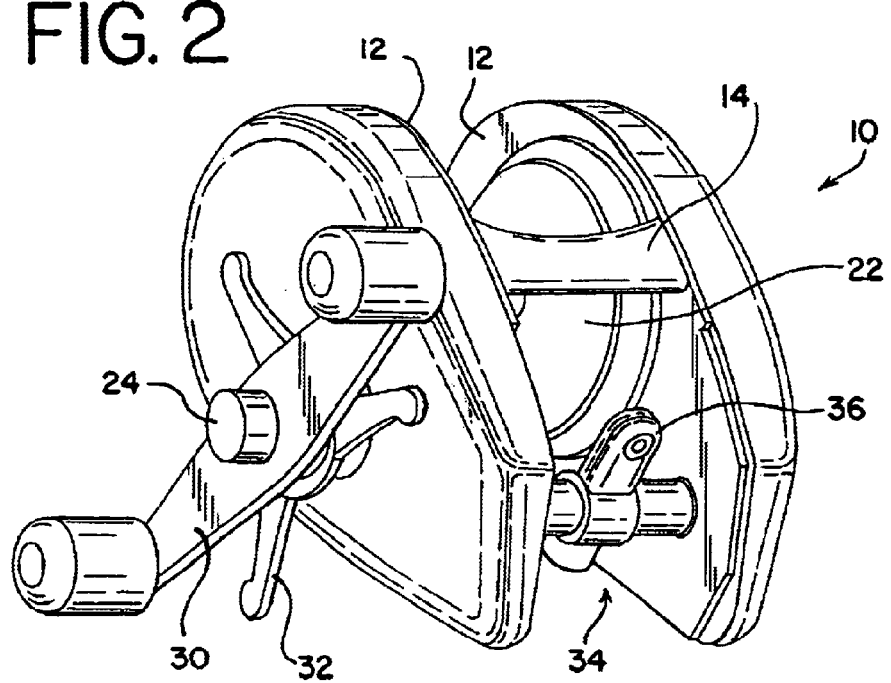

LEVEL WIND MECHANISM

BACKGROUND

The present invention relates to a bait casting fishing reel and, more particularly, to an improved level wind mechanism forming a part of a bait casting reel.

The bait casting fishing reel has become the reel of choice among skilled fisherman, particularly when used for surf casting, deep sea fishing and bass fishing. Because of the habitat favored by bass, accurate casting is required to avoid having the line or bait become tangled in various obstacles, such as logs, branches and water plants. Skilled anglers find that they can more accurately cast with a bait casting reel than with a spinning or spin casting reel.

Bait casting reels typically include a level wind mechanism located in front of the reel to help to insure that the fishing line is evenly wound upon the spool as it is reeled in. The general design of the level wind mechanism has remained unchanged for over 100 years, and is typified by that illustrated in FIG. 1. (See also, e.g., U.S. Pat. No. 2,204,125 to Dayton). The level wind mechanism 1 employs a screw or shaft 2 mounted between the reel side plates 3 for rotation in parallel alignment with the spool 4. The shaft 2 comprises a worm gear that has a continuous thread 5 cut in both directions so that the thread 5 crosses back on itself multiple times along the axis of the shaft. The shaft 2 includes a sleeve, block or equivalent structure 6 slidingly mounted thereon that includes a pawl or claw (not shown) that engages the thread 5 so that, as the shaft 2 is rotated by means of the handle 7, the sleeve traverses back and forth in front of the full width of the spool 4. The sleeve also supports a line guide 8 through which the fishing line is threaded. Accordingly, the line guide 8 moves back and forth in front of the spool as the line is wound in, in order to evenly distribute the line on the spool.

The level wind is generally a complicated mechanism requiring several small parts and precise machining, particularly for the threads of the worm gear. The worm gear is especially susceptible to wear at the cross-over points of the continuous thread and, consequently, to malfunctioning. A typical bass fisherman makes about one cast per minute, so that, during a normal day of fishing he may make as many as 500 casts. The length of a typical cast is sixty feet. Retrieving a sixty foot cast results in the line guide block reciprocating on the worm gear between 5 and 6 times (forth & back) as the cast is reeled in. Therefore, the line guide block will reciprocate from 2500 to 3000 times. Thus, the potential for wear of the worm gear, particularly at the cross over points of the thread, is apparent.

The continuous thread is also subject to fouling from various elements, as they are exposed to the elements, including dirt, sand and salt spray, and run very loose tolerances due to the pawl having to turn around at the ends of the worm gear. In contrast, the other gear sets enjoy a closed environment with tight tolerances.

Due to these reliability issues, many salt water reels do not include a level wind, thus requiring the user to manipulate the line by hand in an attempt to evenly wind the line along the spool. The level wind mechanism is also one of the more expensive components of the reel assembly and requires major disassembly to repair. The level wind mechanism is also sufficiently complex to make it virtually impossible to repair in the field.

Accordingly, it is the principal object of the present invention to provide for a fishing reel having an improved level wind mechanism.

More specifically, it is an object of the present invention to provide a level wind mechanism that is simple to manufacture, long wearing, and easy to install.

SUMMARY OF THE INVENTION

These objects, as well as others which will become apparent upon reference to the accompanying drawings and following description, are provided by a fishing reel with side walls with a spool shaft rotatably supported therebetween. The spool shaft supports the spool that holds the fishing line. A handle shaft is provided that includes a driving gear that engages a pinion on the spool shaft for winding in the fishing line upon the spool.

A generally transverse shaft is rotatably secured between the side walls in front of the spool. The transverse shaft is adapted to be rotated by the driving gear, and is formed with a single continuous groove substantially along the length thereof that extends approximately 180° about the shaft in a first direction and then reverses direction to extend approximately 180° in the opposite direction. As can be appreciated, this means that the groove does not cross over itself anywhere along the length of the transverse shaft.

A block carrying a line guide is slidingly received on the shaft, the block including a pawl that engages the thread so that, as the shaft is rotated by the handle, the block and its associated line guide move back and forth in front of the spool, to evenly distribute the line on the spool as it is wound in.

In another aspect of the invention, the transverse shaft is formed of multiple parts comprising a central shaft and a two or three-piece sleeve that is received on the shaft has the thread formed therein. The sleeve is formed of identically-shaped parts that generally include interlocking portions to secure the parts of the assembled sleeve together.

The invention contemplates several distinct embodiments for the transverse shaft, each which includes an elongated sub-shaft that typically carries a gear that is engaged by a gear on the handle shaft so that, upon rotation of the crank handle, the sub-shaft is rotated, thus causing the line guide to move back and forth in front of the spool.

In a first embodiment the transverse shaft includes a two-part cylindrical sleeve adapted to be mounted on the sub-shaft, each sleeve having an inner cylindrical portion with a face perpendicular to the longitudinal axis of the transverse shaft and an outer cylindrical portion having a helically-shaped lip that defines the groove or thread for receiving the pawl associated with the line guide when assembled on the sub-shaft. The perpendicular face of the inner cylindrical portion of each sleeve includes a radially opposed key and keyway for interlocking the two sleeves to each other.

In a second embodiment, similar to the first embodiment, the interlocking members comprise a peg a hole.

In a third embodiment, also similar to the first embodiment, the face of the inner cylindrical portion forms an oblique angle with respect to the longitudinal axis of the transverse shaft. No interlocking members are provided on the face of the inner cylindrical portion. Instead, the two parts are secured to each other by, e.g., an adhesive.

In a fourth embodiment, the transverse shaft includes a three-part sleeve adapted to be mounted on the sub-shaft. An inner cylindrical portion is provided onto which is mounted two outer cylindrical sleeves, each having a helically-shaped lip to define the groove or thread. The interior surface of each outer cylindrical sleeve includes a longitudinal spline that mates with a complementary-shaped longitudinal groove on the exterior of the inner cylindrical portion for securing the three pieces to each other.

BRIEF DESCRIPTION OF THE DRAWINGS

The invention is illustrated diagrammatically in the following drawings wherein:

FIG. 1 is a plan view of a typical prior art bait casting reel employing a level wind mechanism of the type well known in the art.

FIG. 2 is a perspective view of a bait casting fishing reel incorporating a level wind mechanism according to the present invention.

DETAILED DESCRIPTION OF THE PREFERRED EMBODIMENT

Figure 3:
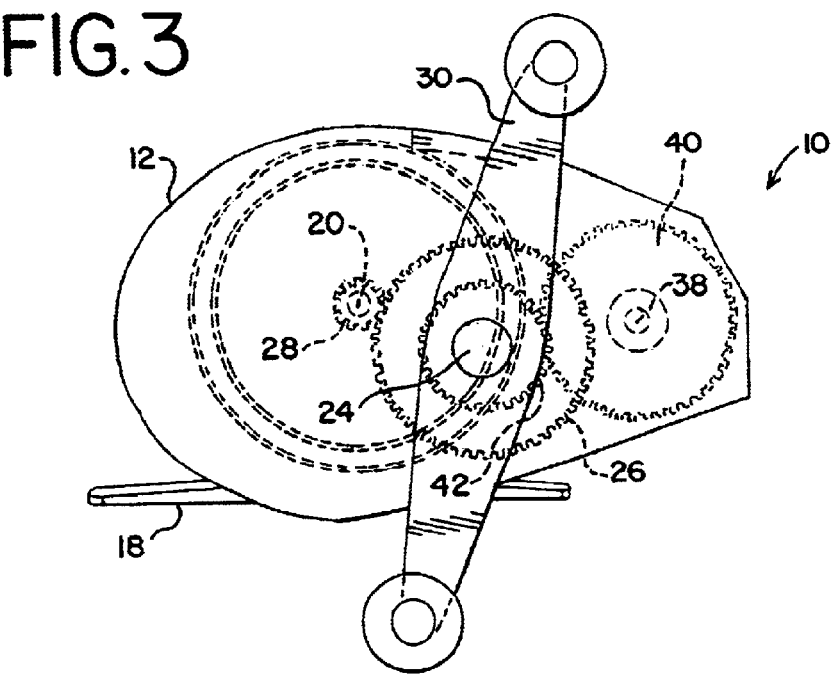
FIG. 3 is a side view of a fishing reel according to the present invention showing a conventional drive mechanism for the level wind.
Figure 4:
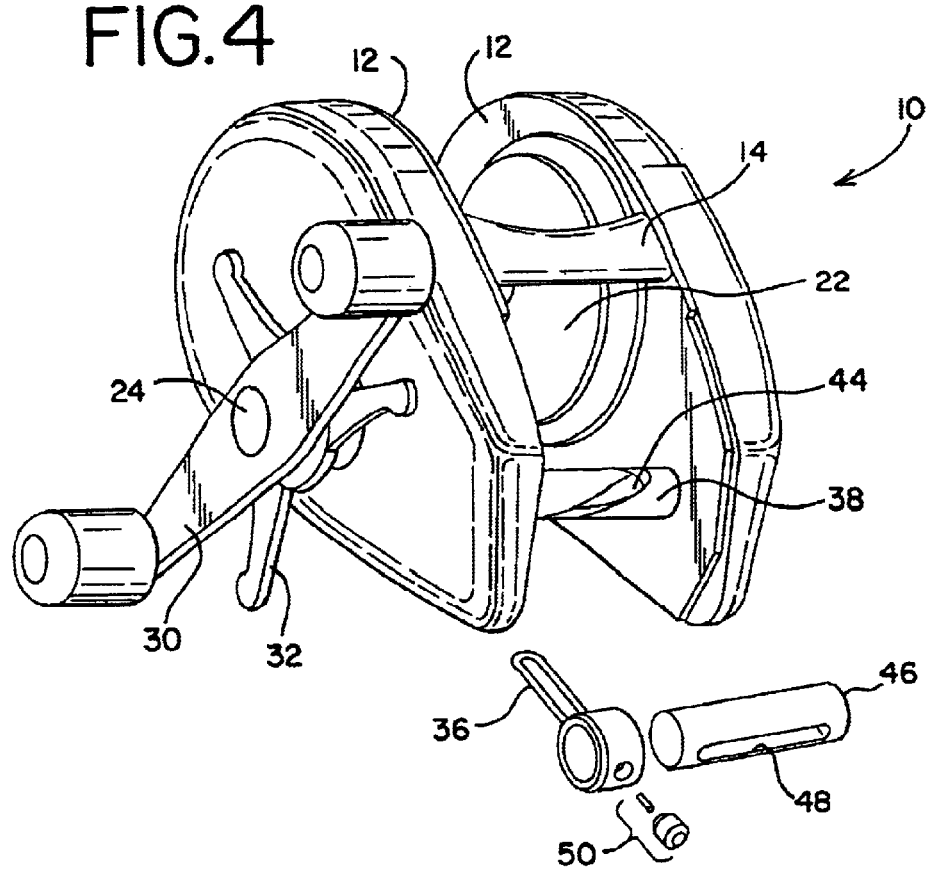
FIG. 4 is an exploded perspective view of a fishing reel according to the present invention.

Turning to FIGS. 2–4, there is seen a bait casting fishing reel, generally designated 10, according to the present invention. As is well known, the reel 10 includes two opposed side walls 12 typically joined together in spaced relationship by upper and lower cross-members, with only the upper cross member 14 being visible. The lower cross-member supports a foot or rod mount 18 to facilitate securing the reel 10 to a fishing rod (not shown).

A spool shaft 20 (best seen in FIG. 3) is rotatably supported between the side walls 12, to which a spool 22 is secured for holding fishing line. To rotate the spool 22 to wind in the fishing line, the reel 10 includes a handle shaft 24 (best seen in FIG. 3) that includes a driving gear 26 that selectively engages a pinion 28 mounted on the spool shaft 20. A crank handle 30 is secured to the handle shaft 24 to facilitate the rotating of the handle shaft by the fisherman. A drag adjustment 32 may also be provided.

A novel level wind mechanism 34 is provided for winding the fishing line evenly upon the spool 20 as the line is reeled in. As is typical, the level wind 34 includes a line guide 36 comprising a block and an eyelet through which the fishing line is threaded. The line guide 36 moves back and forth in front of the spool to lay the fishing line evenly along the full width of the spool 22.

To this end, the level wind 34 includes a generally transverse shaft 38 rotatably supported between the side walls 12 in front of the spool 22. The shaft 38 includes a gear 40 that is engaged by a gear 42 on the handle shaft 24 so that the shaft 38 may be rotated about its longitudinal axis upon rotation of the crank handle 30, which simultaneously rotates the spool shaft 20/spool 22 in a direction to reel in the fishing line. Alternatively, a Geneva motion mechanism employing a star wheel and drive pin may be used to rotate the transverse shaft, as shown in our prior U.S. Pat. No. 6,446,895, which is incorporated by reference herein.

In keeping with one aspect of the invention the transverse shaft 38 is formed with a single continuous helical thread or groove 44 extending along substantially the entire length thereof. The helical groove 44 extends approximately 180° about the shaft in a first direction and then reverses direction to extend approximately 180° about the shaft in the opposite direction. Thus, the groove 44 does not cross over itself anywhere along the length of the transverse shaft, in contrast to the continuous thread 5 found in the prior art devices.

When assembled, a sleeve 46 having a slot 48 is mounted over the transverse shaft and carries the line guide 36. A pawl 50 is secured to the line guide 36 through the slot 48 so that it engages the continuous helical thread 44 in the transverse shaft 38. The pawl 50 may simply comprise a pin with a rounded end that is received in the groove 44, and may be made of metal, ceramic or plastic material. Thus, upon rotation of the transverse shaft, the line guide moves back and forth in front of the spool to evenly wind line thereon.

In another aspect of the present invention, the transverse shaft is comprised of multiple parts, in contrast to the prior art shafts, which were typically made of a single member that is precision machined to form the continuous thread. The simplified design and the multi-piece construction reduces the cost of manufacture. The transverse shaft can be made by well-known compression or injection molding techniques. Further a greater range of acceptable materials may be used in its manufacture, including ceramics, aluminum, brass and plastics, such as nylon or delrin. Such materials provide for a transverse shaft that is corrosion proof and for which no lubrication is needed.

Figure 5:
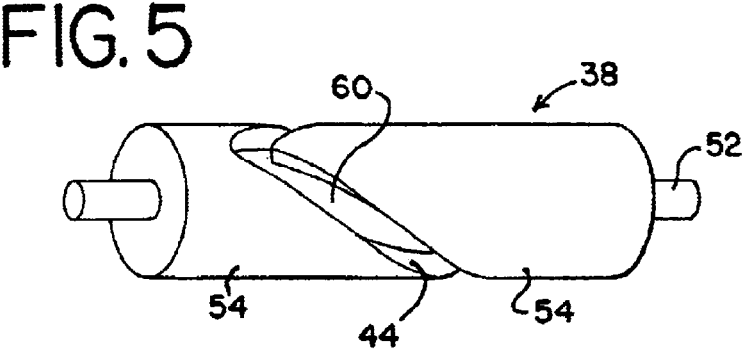
FIG. 5 is a perspective view of a transverse shaft for moving the line guide in accordance with the present invention.
Figure 6:
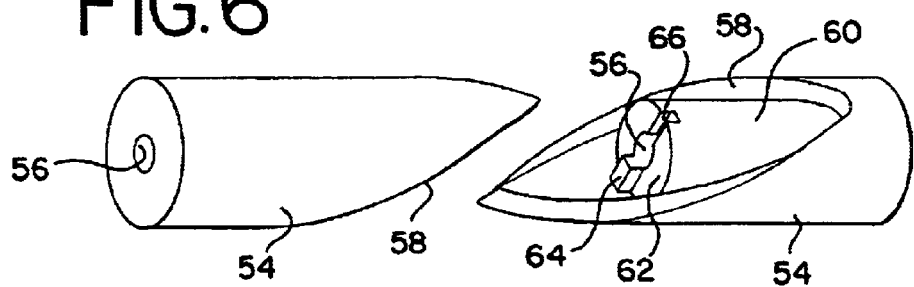
FIG. 6 is an exploded perspective view of a first embodiment of a transverse shaft for a level wind mechanism according to the present invention.
Figure 7A:
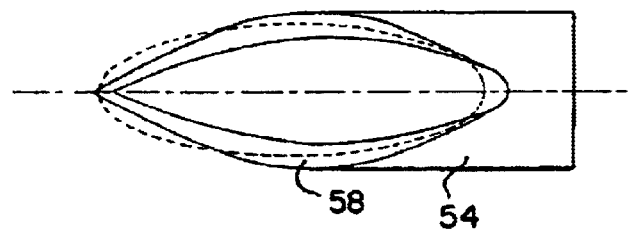
FIGS. 7A and 7B are, respectively, top and front views of a portion of a sleeve member for the transverse shaft according to the present invention.
Figure 7B:
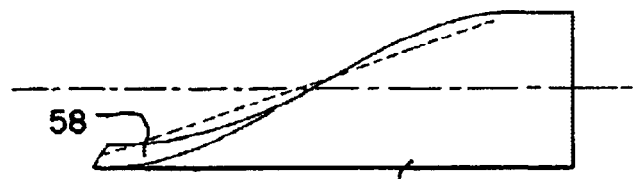

Turning to FIGS. 5 and 6, there has seen a first embodiment of a transverse shaft according to the present invention. The transverse shaft 38 includes a sub-shaft 52. The sub-shaft 52 may be formed either integrally with two sleeve members 54, or separately therefrom, with each sleeve member 54 having a central bore 56 for receiving the sub-shaft 52. Each sleeve 54 terminates at one end thereof in an helically-shaped lip 58. When the two sleeves are mounted together on the sub-shaft 52, the helically-shaped lips combine to form the continuous groove 44 in the transverse shaft 38. The lips 58 form a thread that is generally helical in configuration and that extends substantially across the width of the transverse shaft 180° in a first direction, and then reverses direction to extend approximately 180° in the opposite direction. With reference to FIGS. 7A and 7B, the helical lip 58 in each sleeve 54 is formed so that it defines a surface that engages the pawl 50 that is perpendicular to the longitudinal axis of the shaft 38 along the entire length of the lip 58. This ensures full engagement of the pawl 50 with the helical groove 44 across the entire length of the groove 44.

Figure 9:
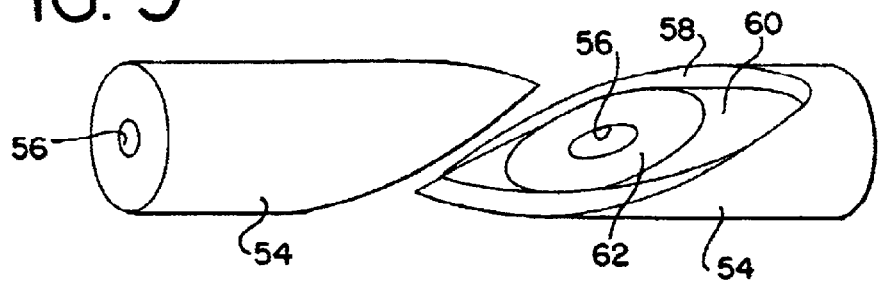
FIG. 9 is an exploded perspective view of complementary parts for a third embodiment of the rotatable shaft for a level wind mechanism according to the present invention.

Each sleeve 54 is formed with an inner cylindrical portion 60 that protrudes partially through the helically-shaped lip 58 and terminates in a planar face 62. As shown in FIG. 6, the planar face is disposed perpendicularly to the axis of the sub-shaft 52. Alternatively, the planar face 62 of the inner cylindrical portion 60 can be disposed obliquely with respect to the longitudinal axis of the sub-shaft, as shown in FIG. 9.

Figure 8:
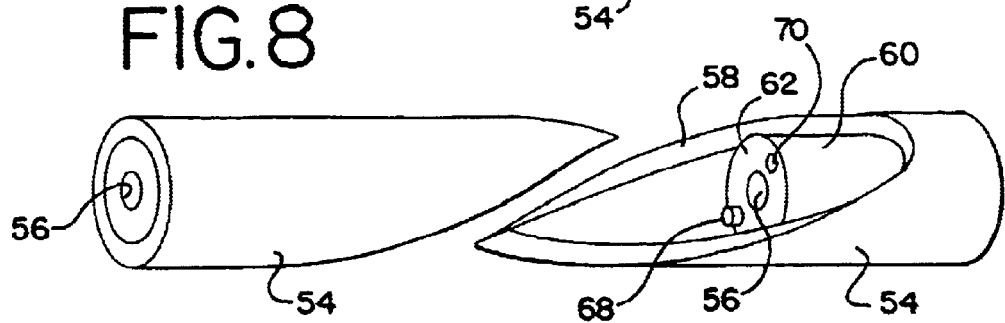
FIG. 8 is an exploded perspective view of a second embodiment of the rotatable shaft portion for the level wind mechanism according to the present invention.
Figure 10:
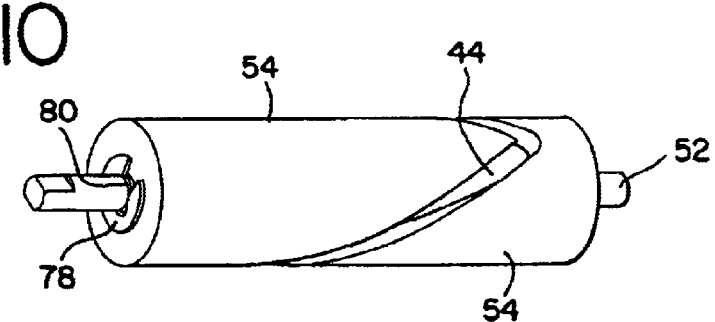
FIG. 10 is a perspective view of the complementary parts of FIG. 9 secured to the sub-shaft by retaining rings.

In keeping with another aspect of the invention, the planar faces 62 of the inner cylindrical portion 60 can be formed with mating members that interconnect the two sleeve members 54 to each other. As shown in FIG. 6, the mating members may comprise a key 64 and a radially opposed keyway 66. In an alternative embodiment, the mating members may comprise a peg 68 and radially opposed hole 70, as shown in FIG. 8. In a further embodiment, shown in FIG. 9, the planar face 62 does not include any mating members, and the two sleeve 54 may be secured to each other by, for example, an adhesive or by a pair of retaining rings 78 (one shown) that snap fit onto grooves 80 in the sub-shaft 52 (see FIG. 10).

Figure 11A:
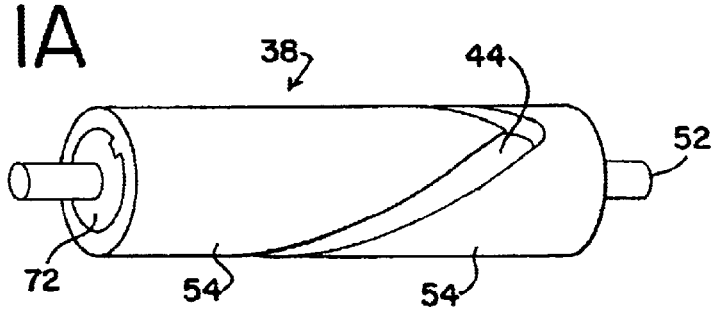
FIGS. 11A and 11B are perspective and exploded perspective views, respectively, of a fourth embodiment of the rotatable shaft for a level wind mechanism according to the present invention.
Figure 11B:
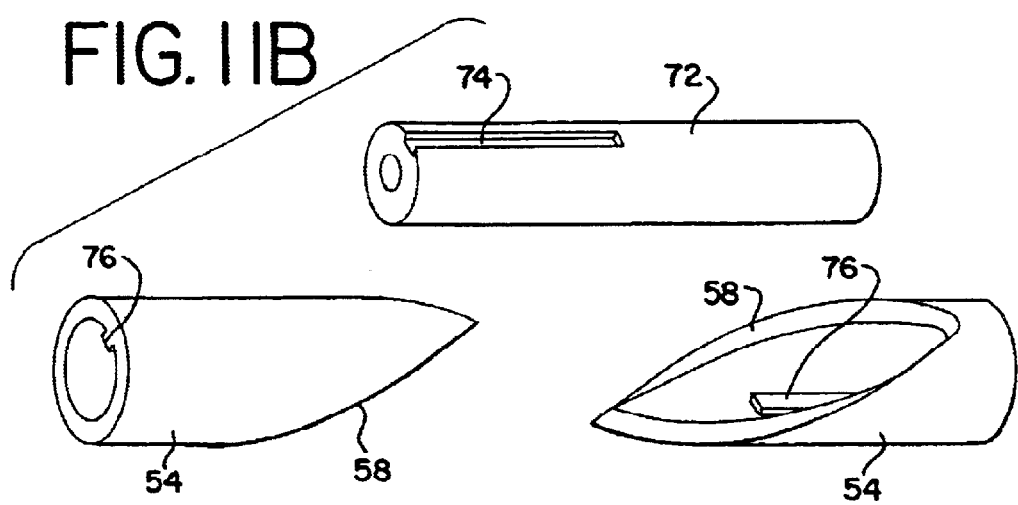

In a further embodiment, shown in FIGS. 11A and 11B, the two sleeves 54 are mounted to an intermediate sleeve 72 which is mounted to the sub-shaft 52 for rotation therewith. The sleeves 54 and intermediate sleeve 72 are formed with mating members to secure them to each other. As illustrated, the intermediate member includes a longitudinal slot 74 on each end, (only one shown) the slots 74 being radially opposed to each other. The sleeves 54 includes a spline 76 that is slidingly received in the slots 74.

While the invention has been described in terms of certain preferred embodiments, other variations will become apparent to those skilled in the art. Thus, there is no intention to limit the invention the described embodiments. Instead, the invention is to be defined by the appended claims.

What is claimed is:

1. A fishing reel comprising:
    side walls;
    a spool shaft rotatably supported between the side walls;
    a spool supported on the spool shaft for holding fishing line;
    a handle shaft;
    a driving gear on the handle shaft;
    a pinion on the spool shaft for selectively engaging the driving gear for winding in the fishing line upon the spool;
    and a level wind, the level wind comprising a multipart-part transverse shaft rotatably secured between the side walls in front of the spool, the transverse shaft having a longitudinal axis and being adapted to be rotated about its axis by the driving gear, the transverse shaft being formed with a single continuous helical groove along the length thereof extending approximately 180° about the shaft in a first direction and then approximately 180° about the shaft in an opposite direction, and a line guide comprising a block mounted to the transverse shaft and having a pawl for engaging the continuous groove and an eyelet through which the fishing line is threaded;
    whereby the line guide oscillates back and forth in front of the spool upon rotation of the transverse shaft by the driving gear so that when fishing line is reeled in it is wound evenly along the length of the spool.

2. The fishing reel of claim 1 wherein the transverse shaft further comprises:
    a sub-shaft having opposed ends which are adapted to be rotatably mounted to the side walls of the fishing reel; and
    first and second cylindrical sleeves adapted to be carried by the sub-shaft for rotation therewith, each sleeve terminating at one end thereof in an helically-shaped lip, so that when the sleeves are carried by the sub-shaft, the lips of the sleeves define the continuous helical groove.

3. The fishing reel of claim 2 wherein each sleeve further comprises an inner cylindrical portion, the inner cylindrical portion protruding partially through the lip and terminating in a planar face.

4. The fishing reel of claim 3 wherein the planar faces of the inner cylindrical portion define mating members that interconnect the first and second sleeve members.

5. The fishing reel of claim 4 wherein the mating members comprise a key and keyway.

6. The fishing reel of claim 4 wherein the mating members comprise a peg and hole.

7. The fishing reel of claim 3 wherein the planar faces of the inner cylindrical portion are disposed perpendicularly to the longitudinal axis of the sub-shaft.

8. The fishing reel of claim 3 wherein the planar faces of the inner cylindrical portion are disposed obliquely with respect to the longitudinal axis of the sub-shaft.

9. The fishing reel of claim 3 wherein the sub-shaft is formed integrally with the first and second sleeve members.

10. The fishing reel of claim 3 wherein the planar faces of the inner cylindrical portion of the sleeve members are secured to each other by an adhesive.

11. The fishing reel of claim 3 wherein the sleeve members are maintained in position on the sub-shaft by retaining rings.

12. The fishing reel of claim 2 wherein the transverse shaft further comprises an intermediate sleeve mounted to the sub-shaft for rotation therewith, the intermediate, first, and second sleeves being formed with mating members that interconnect the intermediate, first, and second sleeves.

13. A level wind for use with a fishing reel having side walls, a spool supported upon a spool shaft between the side walls, and a handle shaft having a driving gear associated therewith, the level wind comprising;
    a multipart-part transverse shaft rotatably secured between the side walls in front of the spool, the transverse shaft having a longitudinal axis and being adapted to be rotated about its axis by the driving gear, the transverse shaft being formed with a single continuous helical groove along the length thereof extending approximately 180° about the shaft in a first direction and then approximately 180° about the shaft in an opposite direction and a line guide comprising a block mounted to the transverse shaft and having a pawl for engaging the continuous groove and an eyelet through which a fishing line is threaded;
    whereby the line guide oscillates back and forth in front of the spool upon rotation of the transverse shaft by the driving gear.

14. The level wind for use with a fishing reel of claim 13 wherein the transverse shaft further comprises:
    a sub-shaft having opposed ends which are adapted to be rotatably mounted to the side walls of the fishing reel; and
    first and second cylindrical sleeves adapted to be carried by the sub-shaft for rotation therewith, each sleeve terminating at one end thereof in an helically-shaped lip, so that when the sleeves are carried by the sub-shaft, the lips of the sleeves define the continuous helical groove.

15. The level wind for use with a fishing reel of claim 14 wherein each sleeve further comprises an inner cylindrical portion, the inner cylindrical portion protruding partially through the lip and terminating in a planar face.

16. The level wind for use with a fishing reel of claim 15 wherein the planar faces of the inner cylindrical portion define mating members that interconnect the first and second sleeve members.

17. The level wind for use with a fishing reel of claim 16 wherein the mating members comprise a key and keyway.

18. The level wind for use with a fishing reel of claim 16 wherein the mating members comprise a peg and hole.

19. The level wind for use with a fishing reel of claim 15 wherein the planar faces of the inner cylindrical portion are disposed perpendicularly to the longitudinal axis of the sub-shaft.

20. The level wind for use with a fishing reel of claim 15 wherein the planar faces of the inner cylindrical portion are disposed obliquely with respect to the longitudinal axis of the sub-shaft.

21. The level wind for use with a fishing reel of claim 15 wherein the sub-shaft is formed integrally with the first and second sleeve members.

22. The level wind for use with a fishing reel of claim 15 wherein the planar faces of the inner cylindrical portion of the sleeve members are secured to each other by an adhesive.

23. The level wind for use with a fishing reel of claim 15 wherein the sleeve members are maintained in position on the sub-shaft by retaining rings.

24. The level wind for use with a fishing reel of claim 14 wherein the transverse shaft further comprises an intermediate sleeve mounted to the sub-shaft for rotation therewith, the intermediate, first, and second sleeves being formed with mating members that interconnect the intermediate, first, and second sleeves.

* * * * *